United States Patent
Shiitani et al.

(10) Patent No.: US 8,218,953 B2
(45) Date of Patent: Jul. 10, 2012

(54) VIDEO REPRODUCING DEVICE AND VIDEO REPRODUCING METHOD

(75) Inventors: Shuichi Shiitani, Kawasaki (JP); Masaki Ishihara, Kawasaki (JP); Takayuki Baba, Kawasaki (JP); Susumu Endo, Kawasaki (JP); Daiki Masumoto, Kawasaki (JP); Masashi Urushihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 367 days.

(21) Appl. No.: 12/469,884

(22) Filed: May 21, 2009

(65) Prior Publication Data

US 2010/0027960 A1  Feb. 4, 2010

(30) Foreign Application Priority Data

Jul. 31, 2008 (JP) ................................. 2008-198672

(51) Int. Cl.
*H04N 5/783* (2006.01)
(52) U.S. Cl. ...................................... 386/351; 386/343
(58) Field of Classification Search .................. 386/335, 386/343, 351
See application file for complete search history.

(56) References Cited

U.S. PATENT DOCUMENTS

| | | | |
|---|---|---|---|
| 2002/0012526 A1 * | 1/2002 | Sai et al. | 386/69 |
| 2006/0098942 A1 | 5/2006 | Kim et al. | |
| 2006/0188218 A1 | 8/2006 | Hayashi | |
| 2006/0210240 A1 | 9/2006 | Kitamura | 386/52 |
| 2007/0110398 A1 * | 5/2007 | Broeksteeg | 386/95 |
| 2007/0274686 A1 | 11/2007 | Broeksteeg | |
| 2008/0016089 A1 | 1/2008 | Nishiyama | |
| 2008/0037950 A1 | 2/2008 | Ono et al. | |
| 2008/0273859 A1 | 11/2008 | Broeksteeg | |

FOREIGN PATENT DOCUMENTS

| | | |
|---|---|---|
| CN | 1784898 | 6/2006 |
| CN | 1910913 A | 2/2007 |
| EP | 1 703 505 | 9/2006 |
| EP | 1801808 A1 | 6/2007 |
| JP | 2006-262094 | 9/2006 |
| JP | 2008-98726 | 4/2008 |

OTHER PUBLICATIONS

Extended European Search Report, mailed Oct. 15, 2009, in corresponding European Application No. 09161546.8.
Korean Office Action issued Oct. 22, 2010 in corresponding Korean Patent Application 10-2009-0050798.
Chinese Office Action issued Aug. 12, 2010 in corresponding Chinese Patent Application 200910150410.3.
$2^{nd}$ Notification of Office Action, mailed Sep. 15, 2011, in corresponding Chinese Application No. 200910150410.3 (7 pp.).
European Office Action mailed Mar. 20, 2012 for corresponding European Application No. 09161546.8 (in English language).

* cited by examiner

*Primary Examiner* — Jamie Atala
(74) *Attorney, Agent, or Firm* — Fujitsu Patent Center

(57) ABSTRACT

A television personal computer 40, when saving video data 43 by recording a video content, extracts a section containing a predetermined type of scene from within the video content, and displays, when instructed to reproduce the video data, a picture framing area and a time line. The time line includes blocks specifying the section containing the predetermined type of scene together with this type of scene, and an indicator indicating a reproducing point is displayed on the time line.

3 Claims, 14 Drawing Sheets

FIG.4

42f : RECORDING VIDEO MANAGEMENT TABLE

| ID | BROADCASTING DATE | START | TIME | CHANNEL | TITLE | GENRE |
|---|---|---|---|---|---|---|
| 000001 | 2008/11/26 | 19:30 | 02:24 | 10 | PRELIMINARY MATCH OF WORLD CUP | SPORTS |
| 000002 | 2008/11/27 | 19:56 | 00:58 | 12 | ORIGINAL MAKER! GET-SATIATED SHOP | VARIETY SHOW |
| 000003 | 2008/11/28 | 19:00 | 00:30 | 8 | DRAKON BOY | ANIMATION |
| 000004 | 2008/11/29 | 21:00 | 00:54 | 6 | MR. CHAPATSU'S CLASS OF FIRST-GRADE | DRAMA |
| 000005 | 2008/11/30 | 20:00 | 00:54 | 4 | BEST TEN SONGS | MUSIC |

FIG.5

424: SKIP DESTINATION DEFINITION TABLE

| GENRE | COMPOSITION | HIGHLIGHT | CM | NEWS |
|---|---|---|---|---|
| MOVIE | – | – | 2 (1 SEC BEFORE TAIL) | 2 (1 SEC BEFORE TAIL) |
| DRAMA | 2 (1 SEC BEFORE TAIL) | | | |
| VARIETY SHOW | – | | | |
| SPORTS | | 0 (3 SEC AFTER HEAD) | | |
| MUSIC | 1 (IMMEDIATE AFTER HEAD) | | | |
| PERFORMANCE | – | | | |
| ANIMATION | 2 (1 SEC BEFORE TAIL) | – | | |
| SOCIETY | | | | |
| HOBBY | | | | |
| CULTURE | | | | |

FIG. 7

44 : SECTION TABLE

| START | END | SCENE TYPE | PATTERN |
|---|---|---|---|
| 00:01:35:13 | 00:04:07:26 | COMPOSITION | 0 |
| 00:04:07:27 | 00:05:37:26 | CM | 2 |
| 00:15:11:05 | 00:16:41:04 | CM | 2 |
| 00:24:39:03 | 00:26:55:00 | COMPOSITION | 0 |
| 00:27:30:00 | 00:30:00:00 | CM | 2 |

VIDEO REPRODUCING DEVICE AND VIDEO REPRODUCING METHOD

CROSS-REFERENCE TO RELATED APPLICATION

The disclosure of Japanese Patent Application No. JP2008-198672 filed on Jul. 31, 2008 including the specification, claims, drawings and abstract is incorporated herein by reference in its entirety.

FIELD

The disclosures made herein relate to a device, a program and a method for reproducing a video content including pictures and sounds (voices) on the basis of video data.

BACKGROUND

As broadly known, a majority of video recording devices can record, as a video content, a TV (television) program broadcasted from a TV station. Accordingly, the recorded video content contains a CM (commercial message) scene and a highlight scene of sports. It is not, however, feasible to grasp where the CM scene and the highlight scene exist on a video time base unless the video content is actually reproduced and viewed.

Further, the majority of video recording devices can edit chapters of the video content. An edit screen normally includes a time line, and an indicator for indicating a chapter point (a delimiter between the chapters) already inserted into an edit target video content and an indicator for indicating a reproducing point of the edit target video content, are displayed on the time line. Therefore, when a user gives an instruction of inserting the chapter point in a status of temporarily stopping reproducing the picture of the video content on the edit screen, the chapter point is set at the reproducing point of the video content, and the indicator indicating the chapter point is added to the same position of the indicator indicating the reproducing point on the time line.

Even when inserting the chapter point into the video content by editing the chapters, it is only possible to simply search for the head of the chapter while reproducing the video content, however, it is not possible to grasp, during the reproduction of the video content and from the indicators on the time line in the chapter-edit, what scene this chapter contains.

The following is a related art to the invention.
[Patent document 1] Japanese Patent Laid-Open Publication No. 2006-262094

SUMMARY

According to an aspect of the disclosures made herein, a video reproducing device includes an extracting unit extracting, when acquiring video data for reproducing a video content consisting of sounds and pictures, a section including a predetermined type of scene from within the video content related to the acquired video data; a reproducing unit reproducing, when accepting an instruction of reproducing the video data from an operator, the video content based on the video data; and a display unit displaying a picture of the video content reproduced by the reproducing unit in a picture framing area, and displaying a time line containing blocks specifying the section extracted by the extracting unit together with the type of the scene and an indicator indicating the reproducing point of the video content.

With this configuration, when instructed to reproduce the video data, it follows that the picture framing area and the time line are displayed. The time line includes the blocks which specify the section containing the predetermined type of scene, together with this type of scene, and hence the user can grasp where the predetermined scene exists on the video time base even during the reproduction of the video content.

An operation according to the video reproducing device disclosed above may be realized by a video reproducing program or a video reproducing method. Namely, the operation may also be realized by the video reproducing program for making a computer operate as a plurality of means functioning in the same way as the respective units of the video reproducing device described above function, and may also be realized by the video reproducing method by which the computer executes the same functions as those of the respective units by way of a plurality of steps. Moreover, the operation may also be realized by loading a readable-by-computer medium stored with the video reproducing program described above into the computer, and making the computer read and execute the video reproducing program.

The objects and advantages of the invention will be realized and attained by means of the elements and combinations particularly pointed out in the claims.

BRIEF DESCRIPTION OF THE DRAWINGS

FIG. 4 is a diagram schematically depicting a recording video management table;

FIG. 5 is a diagram schematically illustrating a skip destination definition table;

FIG. 7 is a diagram schematically depicting a section table;

DESCRIPTION OF EMBODIMENTS

Figure 1:
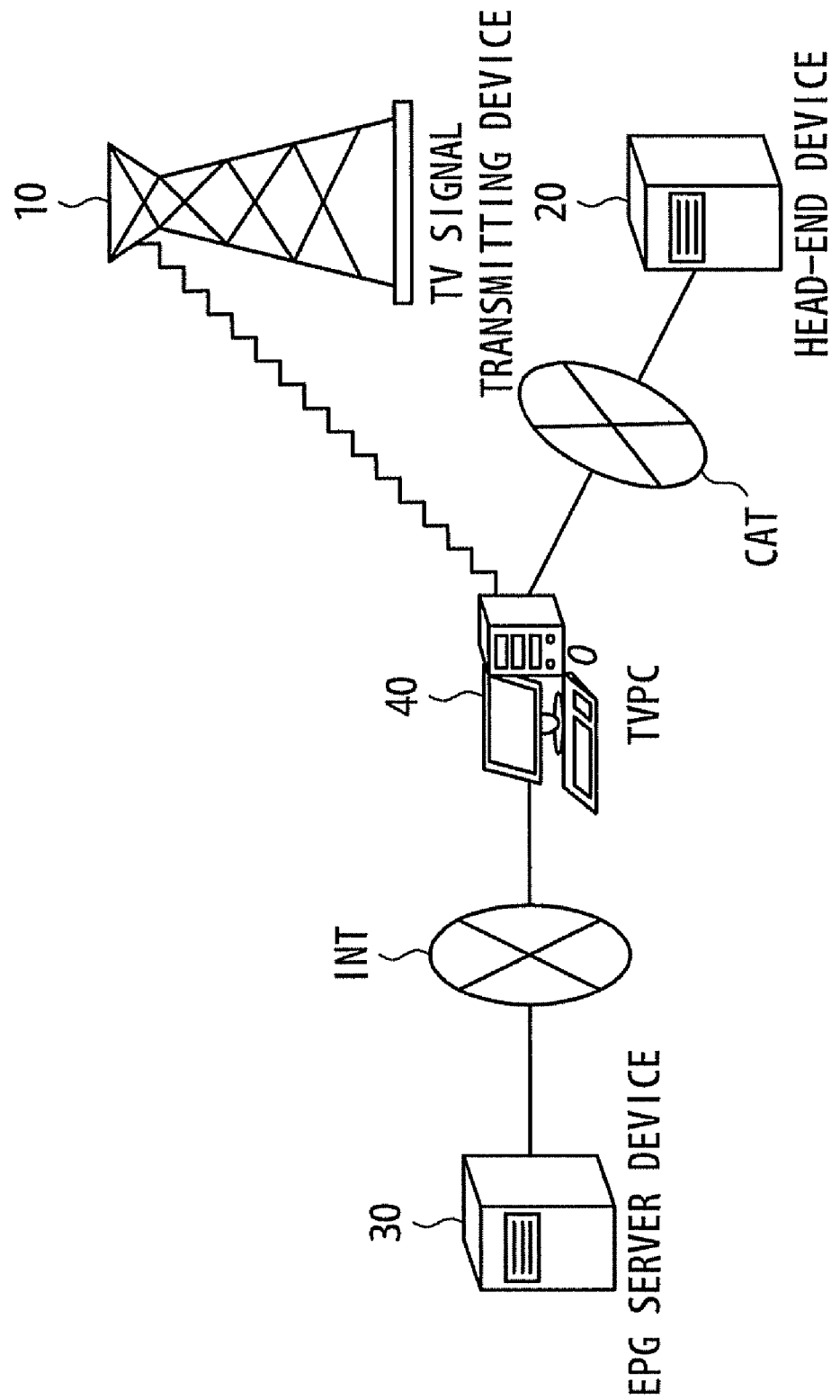
FIG. 1 is a view of architecture of a television system in an embodiment.

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

A television system will hereinafter be described with reference to the accompanying drawings by way of an embodiment of a video reproducing device disclosed earlier.

[[Architecture]]

FIG. 1 is a view of architecture of the television system in the embodiment.

The TV system in the embodiment includes a TV signal transmission device 10, ahead end device 20, an EPG (Electronic Program Guide) server device 30, and a personal computer with a TV function (which will hereinafter be abbreviated to TV PC) 40. Among these components, the TV PC 40 is connected to the head end device 20 via a CATV (Community Antenna Television) network CAT and is also connected to the EPG server device 30 via the internet INT.

The TV signal transmission device 10 is a device for transmitting TV signals in the form of radio waves and is installed in a facility of a TV broadcasting station. Note that EPG information containing program information about TV programs scheduled to be broadcasted by the TV broadcasting station may be superposed as EPG signals on the TV signals transmitted from the TV signal transmission device 10.

The head end device 20 is a device for transmitting the TV signals received from the TV broadcasting station via a community antenna and is installed in a facility of a cable TV broadcasting entrepreneur. Incidentally, if the head end device 20 is of a pass-through type which does not modify the TV signals received by the community antenna, it follows that the EPG information superposed as the EPG signals on the TV signals reach intactly a receiving side. Further, if the head end device 20 is of a transmodulation type which modifies the TV signals received by the community antenna, the original EPG information of the cable TV broadcasting entrepreneur may be superposed as the EPG signals on the TV signals transmitted from the head end device 20.

The EPG server device 30 is a device for providing a Web client with the EPG information containing program information about TV programs scheduled to be broadcasted by the respective TV broadcasting stations. The EPG server device 30, when accepting a request from the Web client via the internet INT, transmits the EPG information to the Web client via the internet INT.

Note that the EPG is a function by which an unillustrated TV receiver displays the electronic program guide on a screen on the basis of the EPG information described above. Moreover, the EPG information, though not illustrated, includes, for every TV program, the program information containing, as broadly known, at least a broadcasting start date, broadcasting time, a channel number, a title of the TV program and a name of genre of the TV program.

Figure 2:
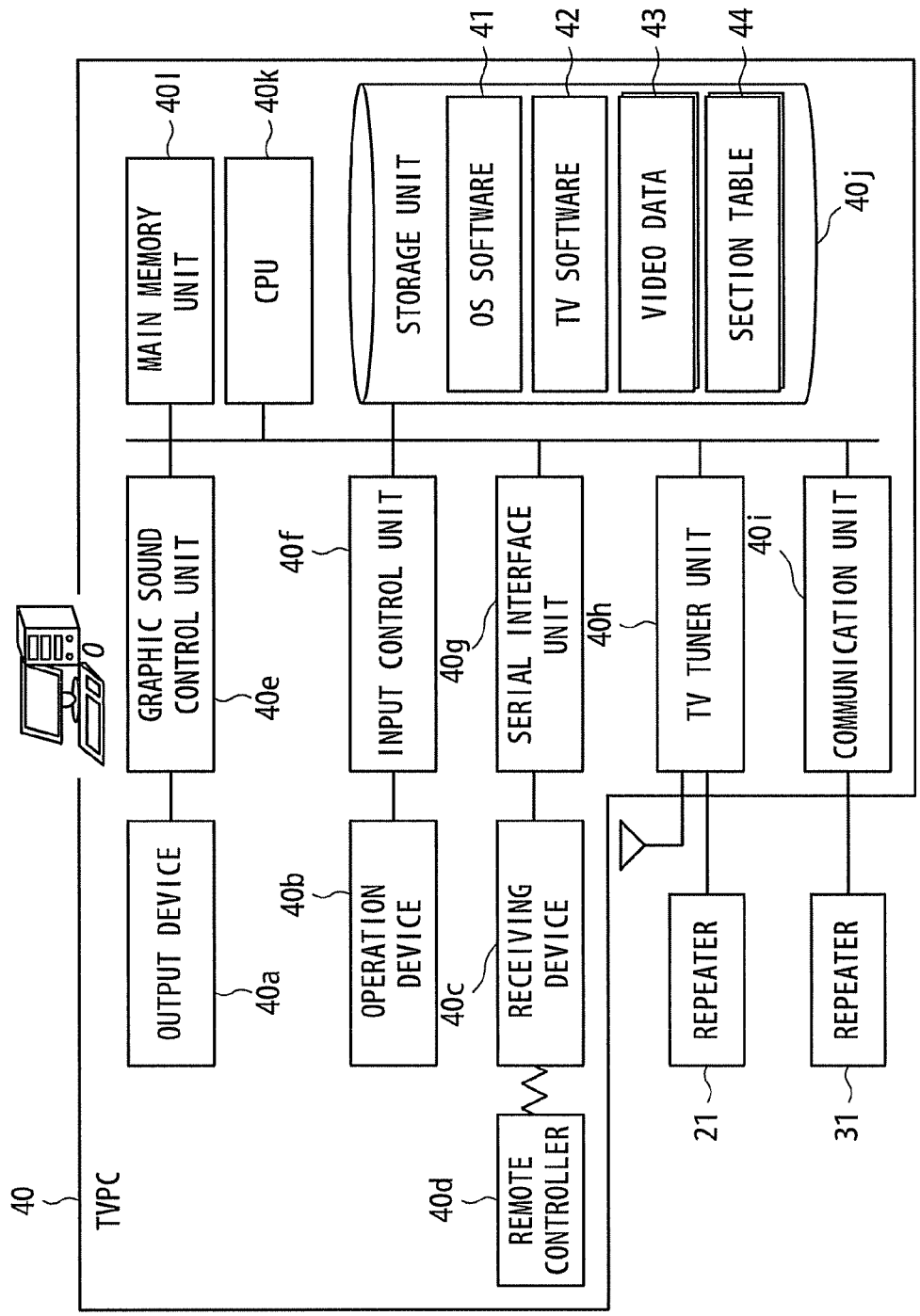
FIG. 2 is a diagram of a configuration of a TV PC.

FIG. 2 is a diagram of a configuration of the TV PC 40.

The TV PC 40 is a personal computer added with a TV function for viewing and recording contents broadcasted from the TV broadcasting stations. The TV PC 40 is constructed of an output device 40a such as a liquid crystal display with a loudspeaker, an operating device 40b such as a keyboard and a mouse, a receiving device 40c which receives an operation signal in the form of optical wireless transmission or radio wave wireless transmission from a remote controller 40d, and a main body to which these devices 40a-40c are connected. The main body thereof incorporates a graphic sound control unit 40e, an input control unit 40f, a serial interface unit 40g, a TV tuner unit 40h, a communication unit 40i, a storage unit 40j, a CPU (Central Processing Unit) 40k and a main memory unit 40l.

The graphic sound control unit 40e is a unit for generating audio/video signals based on audio/video data transferred from the CPU 40k and outputting the audio/video signals to the output device 40a. The input control unit 40f is a unit for accepting the operating signal from the operating device 40b and notifying the CPU 40k of the operating signal.

The serial interface unit 40g is a unit for transferring and receiving the data to and from an external device according to serial communication standards, and the specific communication standards are exemplified by USB (Universal Serial Bus), RS-232C (Recommended Standard 232C), or IEEE (Institute of Electrical and Electronic Engineers) 1394. The serial interface unit 40g is connected to the receiving device 40c via a predetermined communication cable.

The TV tuner unit 40h is a unit for receiving the TV signals of the plurality of channels from the TV signal transmission device 10 and the head end device 20 and extracting the TV signals of a viewing target channel by tuning. The TV tuner unit 40h, if the extracted TV signals are the analog signals, acquires the audio/video data by digitalizing the analog signals, and, if the extracted TV signals are the digital signals, acquires the audio/video data from the TV signals and outputs the data to the outside. Further, the TV tuner unit 40h includes a decoder for, if the audio/video data acquired from the TV signals are compressed data (if the audio/video data is related to the broadcasting other than the analog ground wave broadcasting, i.e., related to the broadcasting via on analog BS (Broadcasting Satellite) waves, digital ground waves, digital BS waves and digital CS (Communication Satellite) waves), decompressing the compressed audio/video data. The TV tuner unit 40h is connected to a TV antenna installed in a general type of house via a coaxial cable and is also connected to a repeater 21 within the CATV network CAT. Note that the TV tuner unit 40h in the embodiment is a TV tuner card built in as an adaptor (expansion card) attachable to and detachable from within the main body of the TV PC 40 and may also be a TV tuner box connected to the serial interface unit 40g in terms of implementing the video reproducing device disclosed earlier. Moreover, the TV tuner unit 40h may include hardware functioning as an encoder which compresses the audio/video data acquired from the TV signals into the video data suited to recording. The encoder is exemplified by an MPEG (Moving Picture Experts Group) encoder. Note that if the TV tuner unit 40h is of a type which does not include the hardware functioning as the encoder such as this, the storage unit 40j, which will be described later on, needs introducing software functioning as the encoder.

The communication unit 40i is a unit for transferring and receiving the data to and from other computers on the internet INT. The communication unit 40i is exemplified such as an Ethernet (trademark of Zerox Corp., U.S.A.) card, an FC (Fiber Channel) card, an ATM (Asynchronous Transfer Mode) card, a Token Ring card and an FDDI (Fiber-Distributed Data Interface) card. The communication unit 40i is connected to a repeater 31 within the internet INT via a network cable. Note that the repeater 31 is exemplified such as a switching hub, a router or an FC switch.

The storage unit 40j is a unit for recording various categories of programs and a variety of data on a recording medium in a readable/writable manner. The storage unit 40j is exemplified by a silicon disk drive device, a hard disk drive device, a DVD (Digital Versatile Disk) drive device, a +R/+RW drive device, or a ED (Blu-ray Disk]) drive device. Further, the recording medium is exemplified such as a silicon disk including a nonvolatile semiconductor memory (flash memory), a hard disk, a DVD (including a DVD-R (Recordable), a DVD-RW (Rewritable), a DVD-ROM (Read Only Memory), a DVD-RAM (Random Access Memory)), a +R/+RW, or a ED (including a BD-R, a ED-RE, a BD-ROM).

The CPU 40k is a unit for executing processes according to the programs in the storage unit 40j. The main memory unit 40l is a unit used for the CPU 40k to cache the program and the data and to develop an operating area.

In the TV PC 40, the storage unit 40*j* is stored with at least OS (Operating System) software 41 and TV (Television) software 42.

The OS software 41 is software for providing API (Application Programming Interface) and ABI (Application Binary Interface) to a variety of applications, managing the storage areas of the storage unit 40*j* and the main memory unit 40*l*, managing processes and tasks, managing files, providing utilities such as a variety of setting tools and an editor to the applications, and allocating windows to a plurality of tasks for multiplexing screen outputs. Further, the OS software 41 includes an unillustrated communication interface program. The unillustrated communication interface program is a program for transferring and receiving the data to and from the communication interface programs of other computers connected via the communication unit 40*i*. The unillustrated communication interface program is exemplified by a TCP/IP (Transmission Control Protocol/Internet Protocol) stack.

Figure 3:
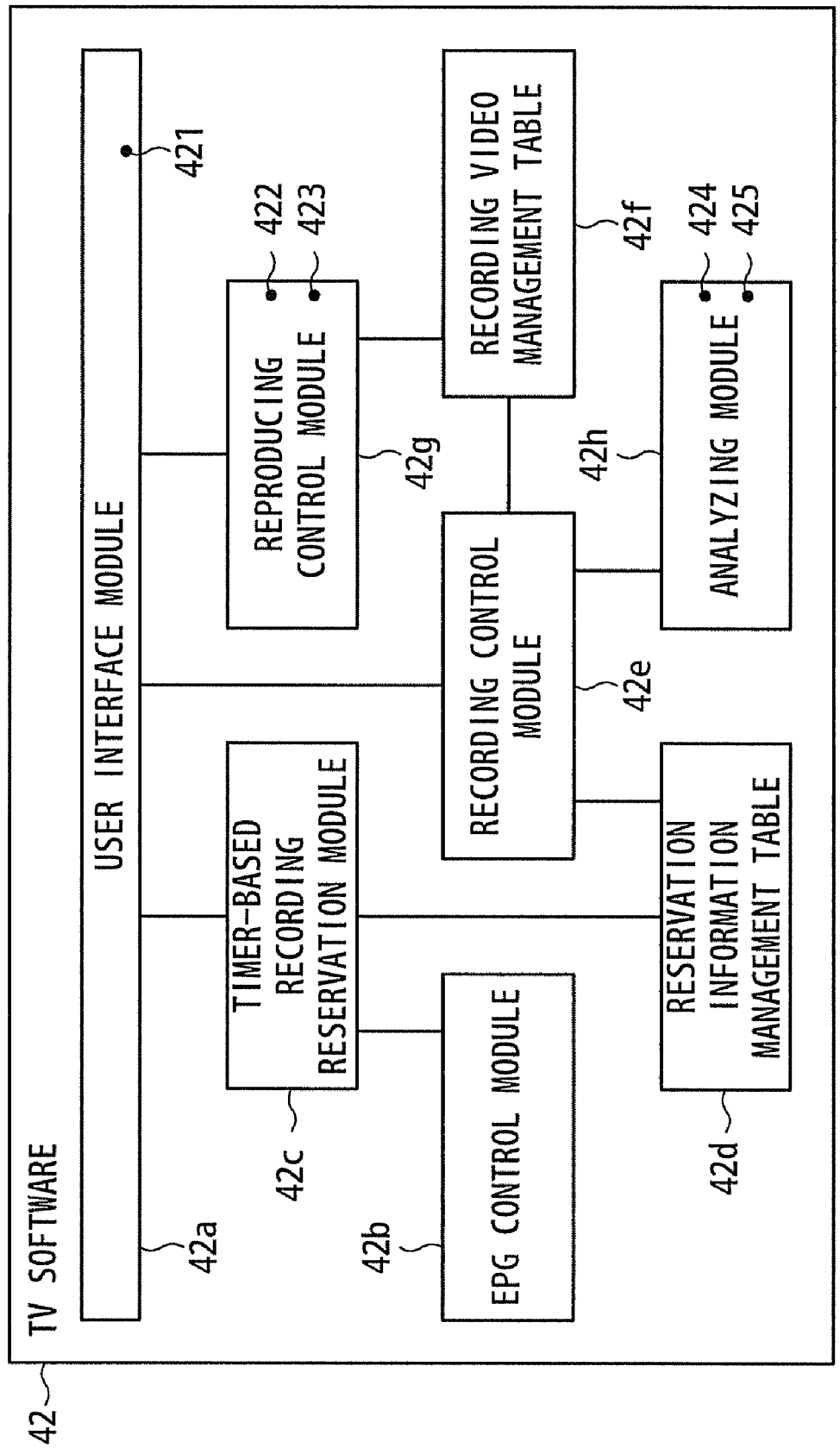
FIG. 3 is a diagram of a configuration of a TV software.

FIG. 3 is a diagram of a configuration of the TV software 42.

The TV software 42 is software for adding, to the personal computer, the TV function for viewing and recording the contents broadcasted from the TV broadcasting stations. The TV software 42 includes a user interface module (program) 42*a*, an EPG control module (program) 42*b*, a timer-based recording reservation module (program) 42*c*, a reservation information management table 42*d*, a recording control module 42*e*, a recording video management table 42*f*, a reproducing control module 42*g* and an analyzing module 42*h*.

The user interface module 42*a* is a module for displaying a list of the TV programs scheduled to be broadcasted, making a timer-based recording reservation of the TV program, visualizing (displaying) an on-broadcasting content, making a start and a stop of recording the on-broadcasting content, and accepting reproduction (a reproduction request) of the content recorded as a video content from an operator via a predetermined GUI (Graphical User Interface) and giving an instruction to the timer-based recording reservation module 42*c*, the recording control module 42*e*, or the reproducing control module 42*g*. Note that the user interface module 42*a* is structured to, when instructed to reproduce the content recorded as the video content, display a reproduction screen (FIG. 8), which will be explained later on, in accordance with a reproduction screen display program 42*l*.

The EPG control module 42*b* is a module which, upon accepting the request from the operator via the user interface module 42*a* and the timer-based recording reservation module 42*c*, acquires the TV signals from the TV signal transmission device 10 or the head end device 20, or acquires the EPG information from the EPG server device 30. The user interface module 42*a* described above, when receiving the EPG information from the EPG control module 42*b* via the timer-based recording reservation module 42*c*, displays the electronic program guide containing the plurality of TV programs in a selection unrestrictive manner to the output device 40*a* on the basis of the plural items of program information contained in the EPG information.

The timer-based recording reservation module 42*c* is a module which reserves timer-based recording of the TV program selected by the operator from within the electronic program guide via the user interface module 42*a*, and reserves the timer-based recording of the content specified by the start date, the start time and the channel that are designated by the operator via the user interface module 42*a*.

The reservation information management table 42*d* is a table for managing the information, as reservation information, on the timer-based recording reserved by the timer-based recording reservation module 42*c*. Each of records of the reservation information management table 42*d* has fields stored with, though not depicted, at least a broadcasting scheduled date (year, month, date), broadcasting start scheduled time, a scheduled broadcasting period and a broadcasting channel. Further, a record related to the TV program of which the timer-based recording is reserved via the electronic program guide has fields recorded with further a title of the TV program, a caption of content of the TV program, the cast of the TV program and a name of genre of the TV program.

The recording control module 42*e* is a module which performs the recording by getting the encoder to compress the audio/video data of the on-broadcasting content output from the TV tuner unit 40*h* and saves the compressed data as video data 43 in the storage unit 40*j*. The recording control module 42*e*, when instructed to start recording the on-broadcasting content from the operator via the user interface module 42*a*, executes the recording, then, when instructed to stop recording, executes the stop, and adds the record of this content to the recording video management table 42*f*. Moreover, the recording control module 42*e* performs the timer-based recording of the reservation information (content) reaching the start date (specified by the broadcasting scheduled date and the broadcasting start time) in the registered pieces of reservation information in the reservation information management table 42*d*. Further, the recording control module 42*e*, when stopping the timer-based recording, adds the record of the content to the recording video management table 42*f* that will be explained later on, and deletes the reservation information on the timer-based recording from the reservation information management table 42*d*. Note that if the TV tuner unit 40*h* includes the hardware functioning as the encoder, the recording control module 42*e* employs this encoder. Furthermore, where if the TV tuner unit 40*h* does not include the hardware functioning as the encoder, the recording control module 42*e* employs (the software functioning as) the self-held encoder.

The recording video management table 42*f* is a table for managing the content related to the video data 43 saved in the storage unit 40*j*. FIG. 4 is a diagram schematically depicting the recording video management table 42*f*. Each of the records of the recording video management table has fields such as an ID (Identification) field, a broadcasting date field, a start field, a time field, a channel field, a title field and a genre field. The ID field is a field recorded with a content ID defined as identifying information for uniquely identifying the content related to the video data 43. The broadcasting date field is a field recorded with the broadcasting date defined as a year/month/date when the content is broadcasted (recorded). The start field is a field recorded with the broadcasting start time defined as the time when the content is broadcasted (recorded). The time field is a field recorded with the recording time defied as a period of time when the content is broadcasted (recorded). The channel field is a field recorded with a channel number of the channel at which the content is broadcasted (recorded). The title field is a field recorded with a title of the TV program related to the content. The genre field is a field recorded with a name of the genre of the TV program related to the content. Note that the timer-based recording reserved by the operator who designates the broadcasting scheduled date, the broadcasting start scheduled time, the scheduled broadcasting time and the channel, involves recording the title and the name of the genre of the first TV program of one or more TV programs included in the content in the title field and the genre field, respectively.

The reproducing control module 42*g* in FIG. 3 is a module which presents the information about the video data 43 registered in the recording video management table 42f to the operator in the freely-selectable manner through the user interface module 42a, and executes the reproduction of the video content based on the video data 43 concerning the information specified by the operator from within the presented information. Incidentally, the reproducing control module 42g includes (software functioning as) a decoder 422 for decompressing the video data 43. Moreover, the reproducing control module 42g includes, when accepting a skip instruction from the operator during the reproduction of the video content, a skip program 423 for adjusting a skip destination. Details of a process executed by the CPU 40k according to the skip program 423 will be described later on with reference to FIGS. 9 through 12. Further, the reproducing control module 42g is also a module which outputs the audio/video data related to the on-broadcasting content at the channel designated by the operator in the on-broadcasting contents to the graphic sound control unit 40e from the TV tuner unit 40h and immediately outputs the content from the output device 40a.

The analyzing module 42h is a module which extracts a section (frames) including a predetermined type of scene from the video content with respect to the video data 43 saved in the storage unit 40j by the recording control module 42e. The analyzing module 42h includes, though not illustrated, a CM extraction program for extracting a section (frames) containing a scene in which a CM (commercial message) runs from within the video content, a highlight extraction program for extracting a section (frames) containing a highlight scene (in which a shout of joy arises and a clap of hands occurs from many people) from within the video content, a composition extraction program for extracting a section (frames) containing a scene in which a piece of music is played from within the video content, and a news extraction program for extracting a section (frames) containing a scene in which news is reported from within the video content. A technique of extracting the section (frames) containing the CM scene is disclosed in, e.g., Japanese Patent Application No. 3840928 or Japanese Patent Laid-Open Publication No. H09-284706, and hence the present specification omits a description of the CM extraction program related to this technique. Further, a technique of extracting the section (frames) containing the highlight scene is disclosed in, e.g., Japanese Patent Application No. 3983532 or Japanese Patent Laid-Open Publication No. 2007-264652, and therefore the present specification omits a description of the highlight extraction program related to this technique. Moreover, a technique of extracting the section (frames) containing the scene of the piece of music is disclosed in, e.g., Japanese Patent Laid-Open Publication No. H 10-247093 or Japanese Patent Laid-Open Publication No. 2000-066691, and hence the present specification omits a description of the composition extraction program related to this technique. Furthermore, a technique for extracting the section (frames) containing a scene of the news is disclosed in, e.g., Japanese Patent Laid-Open Publication No. 2000-285243 or the academic journal titled "Detection of a Cut of News Video and Cut-out of Article Based on Clustering of DCT Characteristics" authored by Yasuo Ariki, the Institute of Electronics, Information and Communication Engineers, pp. 2421-2427, the ninth issue, the volume J80-D-II, September in 1997, and hence the present specification omits a description of a news extraction program according to this technique. The analyzing module 42h includes a skip destination definition table 424 for defining a reproducing point moving method when the skip is indicated during the reproduction of the video content with respect to each combination of the name of the genre of the TV program and the type of the scene.

FIG. 5 is a diagram schematically illustrating the skip destination definition table 424.

The skip destination definition table 424 has the same number of records as the number of names of the plurality of genres that can be contained in the program information on the TV programs. Each record has fields such as a genre field, a composition field, a highlight field, a CM field and a news field. The genre field is a field recorded with the name of the genre. The composition field is a field recorded with a reproducing point moving method in such a case that a normal moving destination of the reproducing point due to the skip during the reproduction of the video content of the very genre becomes the section (frames) containing a scene of the composition (music). Further, the highlight field is a field recorded with a reproducing point moving method in a case where a normal moving destination of the reproducing point due to the skip during the reproduction of the video content of the very genre becomes the section (frames) containing a highlight scene. The CM field and the news field are recorded with reproducing point moving methods in the same way as the composition field and the highlight field are recorded with those methods. Herein, the moving method is specified by a pattern number. The pattern numbers are given No. 0 through No. 2. No. 0 gives a definition that the reproducing point moving destination is set after 3 sec from the head of the section. Moreover, No. 1 gives a definition that the reproducing point moving destination is set to the head of the section, and No. 2 gives a definition that the reproducing point moving destination is set before 1 sec from the tail of the section. Note that with respect to the genre including such a type that the reproducing point is not adjusted based on the skip in the predetermined types (composition, highlight, CM and news), the field of the type in the associated record is blanked (nothing in FIG. 5).

Further, the analyzing module 42h in FIG. 3 includes a section table generating program 425 for generating a section table (FIG. 7), which will be described later on, with respect to every video data 43 saved in the storage unit 40j. Details of the process executed by the CPU 40k according to the section table generating program 425 will be explained later on with reference to FIG. 6.

[[Process]]

[Extraction]

In the TV PC 40 according to the embodiment, the recording control module 42e records the content, thereby saving the video data 43 in the storage unit 40j, which triggers an operation that the CPU 40k reads the section table generating program 425 and starts a section table generating process in accordance with the section table generating program 425.

Figure 6:
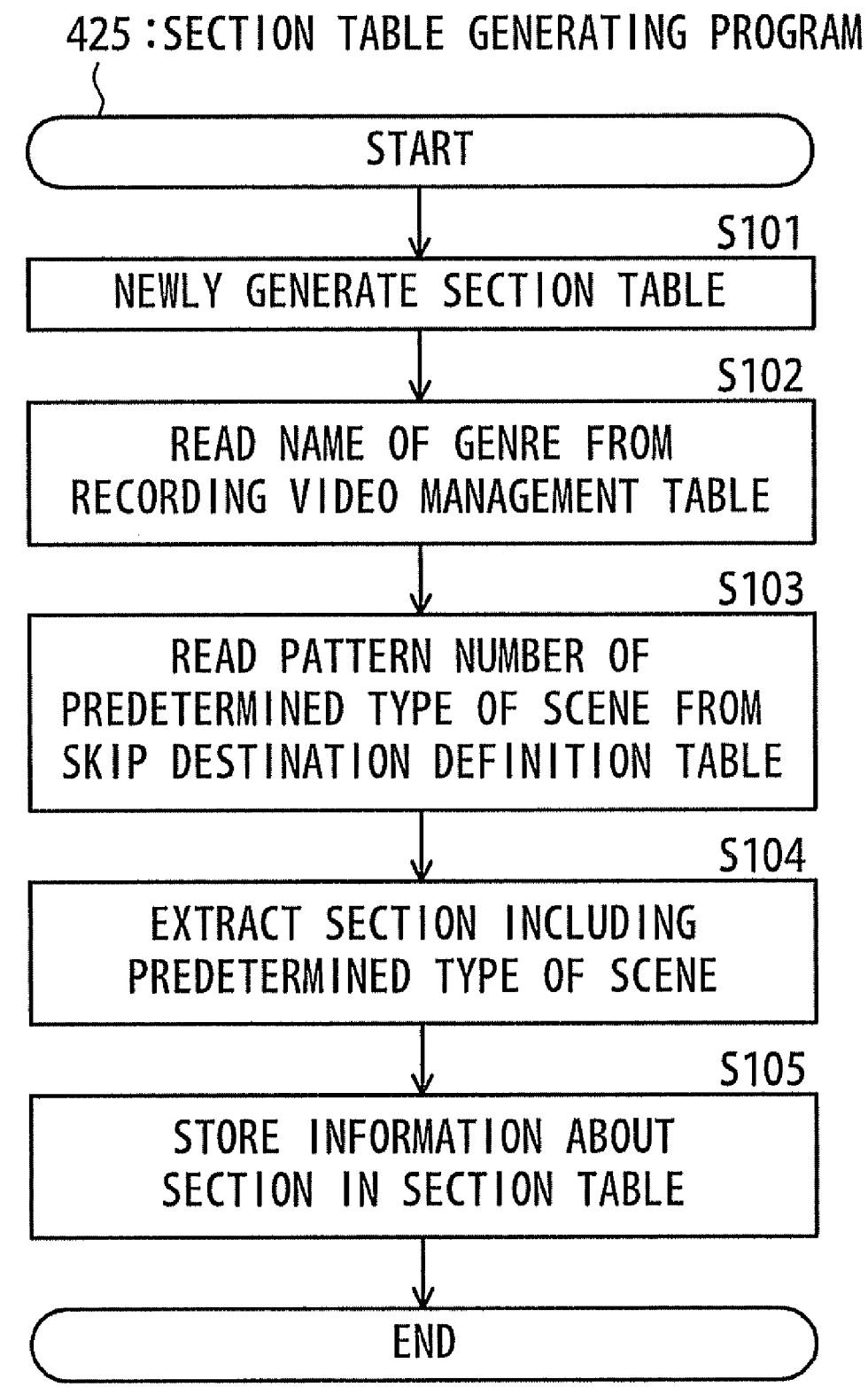
FIG. 6 is a flowchart illustrating a flow of a section table generating process.

FIG. 6 is a flowchart illustrating a flow of the section table generating process.

In first step S101 after starting the section table generating process, the CPU 40k executes a process of newly generating the section table used in the subsequent process and associating this section table with the video data 43 saved in the storage unit 40j by the recording control module 42e.

FIG. 7 is a diagram schematically depicting the section table 44.

Each of records in the section table 44 has fields such as a start field, an end field, a scene type field and a pattern field. The start field and the end field are fields recorded with a point of time of a leading edge and a point of time of a tailing edge, on the video time base, of the section (frames) extracted from within the video content in the process that will be described later on. The scene type field is a field recorded with a type (composition, highlight, CM, news) of the scene contained in the extracted section. The pattern field is a field recorded with a pattern number associated with the type of the scene in the section.

The CPU 40k, after generating a new section table 44 having (blank) records registered with no data, advances the process to step S102.

In step S102, the CPU 40k reads a name of the genre from the records newly registered in the recording video management table 42f (see FIG. 4).

In next step S103, the CPU 40k reads the record associated with the genre name read in step S102 from the skip destination definition table 424, thus acquiring the pattern number of the predetermined type (composition, highlight, CM, news) of the scene in the readout genre.

In next step S104, the CPU 40k executes a process of extracting the section containing the predetermined type of scene with respect to the video data 43 associated with the record newly registered in the recording video management table 42f. To be specific, the CPU 40k decompresses the video data 43 by use of the decoder 422, and instructs each extracting function based on the extraction program described above to extract the section (frames) from the video content associated with the decompressed video data 43. Thereafter, the CPU 40k, upon receiving as a return value the information (the start time and the end time of the section on the video time base, and the type of the scene) about the extracted section from each extracting function, advances the process to step S105.

In step S105, the CPU 40k stores the information on the section extracted in step S104 in the section table 44 associated with the video data 43. If none of the section is extracted in step S103, however, the CPU 40k sets the section table 44 to remain in a status of being stored with no record. Further, the CPU 40k, with respect to each of the records stored in the section table 44, specifies the pattern number associated with the scene type in the record from within the pattern numbers acquired in step S102, and registers the specified pattern number in the associated record. If there is no pattern number associated with the scene type, the pattern field in this record is blanked.

The CPU 40k, when storing the information about the section extracted in step S104 and the pattern number associated therewith in the section table 44, terminates the section table generating process related to FIG. 6.

It should be noted that the CPU 40k executing steps S104 and S105 corresponds to the extracting unit described above.

[Display]

In the TV PC 40 according to the embodiment, when the user interface module 42a accepts an instruction to reproduce the video content selected from within the recorded video contents from the operator, the CPU 40k reads the reproduction screen display program 421 and executes a process of displaying the reproduction screen on the basis of this reproduction screen display program 421.

Figure 8:
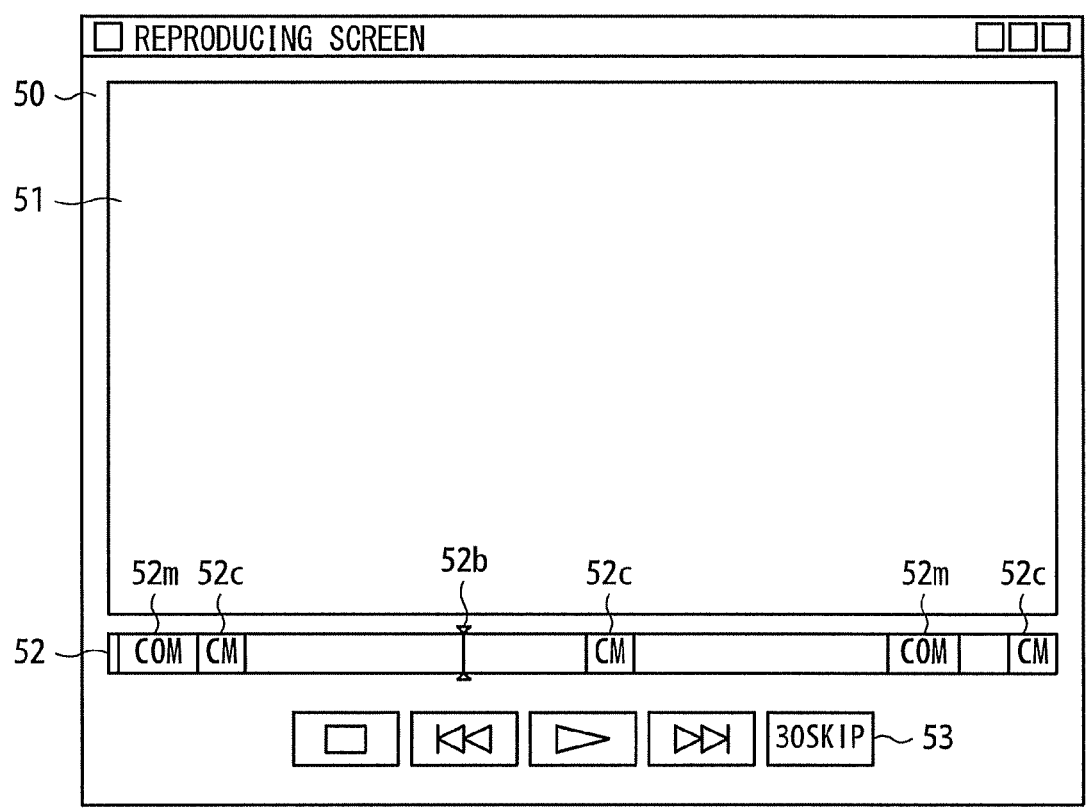
FIG. 8 is a diagram illustrating one example of a reproduction screen.

FIG. 8 is a diagram illustrating one example of a reproduction screen 50.

The reproduction screen 50 in FIG. 8 includes a picture framing area 51 in which to display a video picture, and a time line 52 for displaying, in time-series, items of video-related management information such as a chapter. Further, the reproduction screen 50 includes a 30-sec skip button 53 along with buttons needed for the operation of reproducing the video content such as a stop button, a review button, a reproduction button (functioning as a temporary stop button during the reproduction) and a queue button.

Moreover, a function (which will hereinafter be termed a reproduction screen display function 421) realized by the CPU 40k based on the reproduction screen display program 421 is to read the section table 44 associated with the video data 43 related to the video content chosen by the operator and to display blocks 52m, 52c on the time line 52. The leading edges and the tailing edges of the respective blocks 52m, 52c exist in positions, on the time line 52, corresponding to the start time and the end time contained in the associated record in the section table 44. Moreover, the information specifying the scene type in the associated record in the section table 44 is described in each of the blocks 52m, 52c. It is therefore feasible to grasp where the section containing the predetermined type of scene exists on the video time base, from positions and lengths of the leading edges and the tailing edges of the blocks 52m, 52c on the time line 52 and from internal information.

Further, the reproducing control module 42g executes the reproduction of the video content selected by the operator on the basis of the video data 43 related to this video content, and screens the video picture within the picture framing area 51 on the reproduction screen 50 in FIG. 8. The reproduction screen display function 421 is configured to acquire the information (i.e., the time of the reproducing point on the video time base) specifying which position the reproducing point exists on the video time base by periodically giving a query to the reproducing control module 42g, and the reproduction screen display function 421 displays an indicator 52b indicating the reproducing point on the time line 52 on the basis of the time of the reproducing point acquired from the reproducing control module 42g. Accordingly, it follows that the indicator 52b indicating the reproducing point, in the video reproducing status, moves at a fixed speed from left to right on the time line 52.

It should be noted that the reproducing control module 42g corresponds to the reproducing unit described above, and the reproduction screen display function 42l corresponds to the display unit described above.

[Skip]

In the TV PC 40 according to the embodiment, the 30-sec skip button 53 on the reproduction screen 50 is clicked during the reproduction of the video content (or an unillustrated 30-sec skip button included in a remote controller 40d is pressed), which triggers an operation that the CPU 40k reads a skip program 423 and starts the skip process according to this skip program 423.

Figure 9:
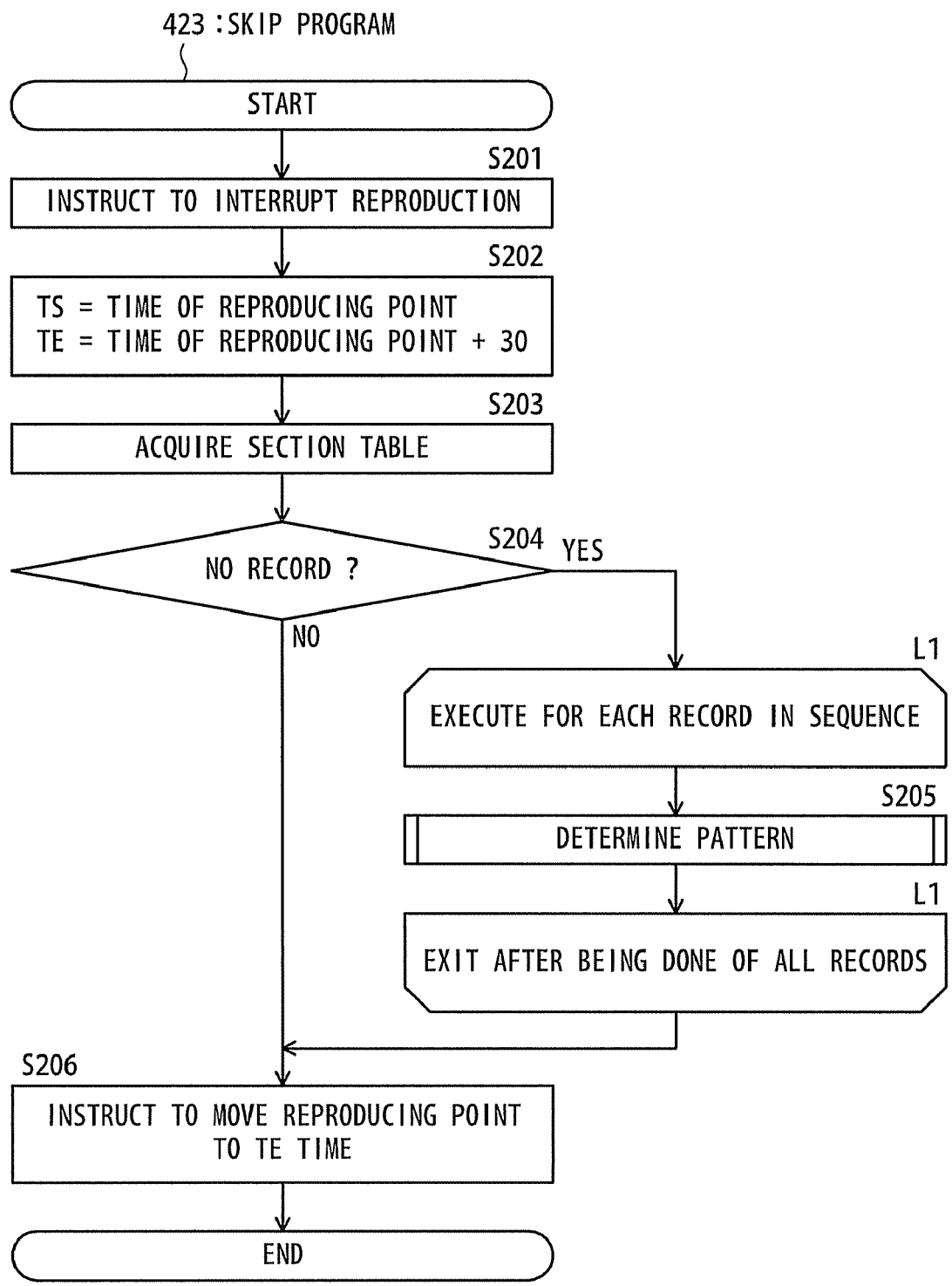
FIG. 9 is a flowchart illustrating a flow of a skip process.

FIG. 9 is a flowchart illustrating a flow of the skip process.

In first step S201 after starting the skip process, the CPU 40k instructs the reproducing control module 42g to interrupt the reproduction of the video content.

It should be noted that the CPU 40k executing step S201 corresponds to the interrupting unit described above.

In next step S202, the CPU 40k substitutes the time (time value) on the video time basis of the reproducing point into a variable TS, and substitutes a value obtained by adding 30 sec to this time value into a variable TE.

In next step S203, the CPU 40k acquires the section table 44 (see FIG. 7) related to the video content of which the reproduction is interrupted in step S201.

In subsequent step S204, the CPU 40k decides whether or not any record exists in the section table 44 acquired in step S203. Then, if none of the record exists in the section table 44 acquired in step S203, the CPU 40k advances the process to step S206 from step S204. Whereas if one or more records exist in the section table 44 acquired in step S203, the CPU 40k diverts the process from step S204 and executes a first processing loop L1.

In the first processing loop L1, the CPU 40k executes step S205 sequentially about each of the records in the section table 44 acquired in step S203.

In step S205, the CPU 40k invokes and executes a pattern determination subroutine.

Figure 10:
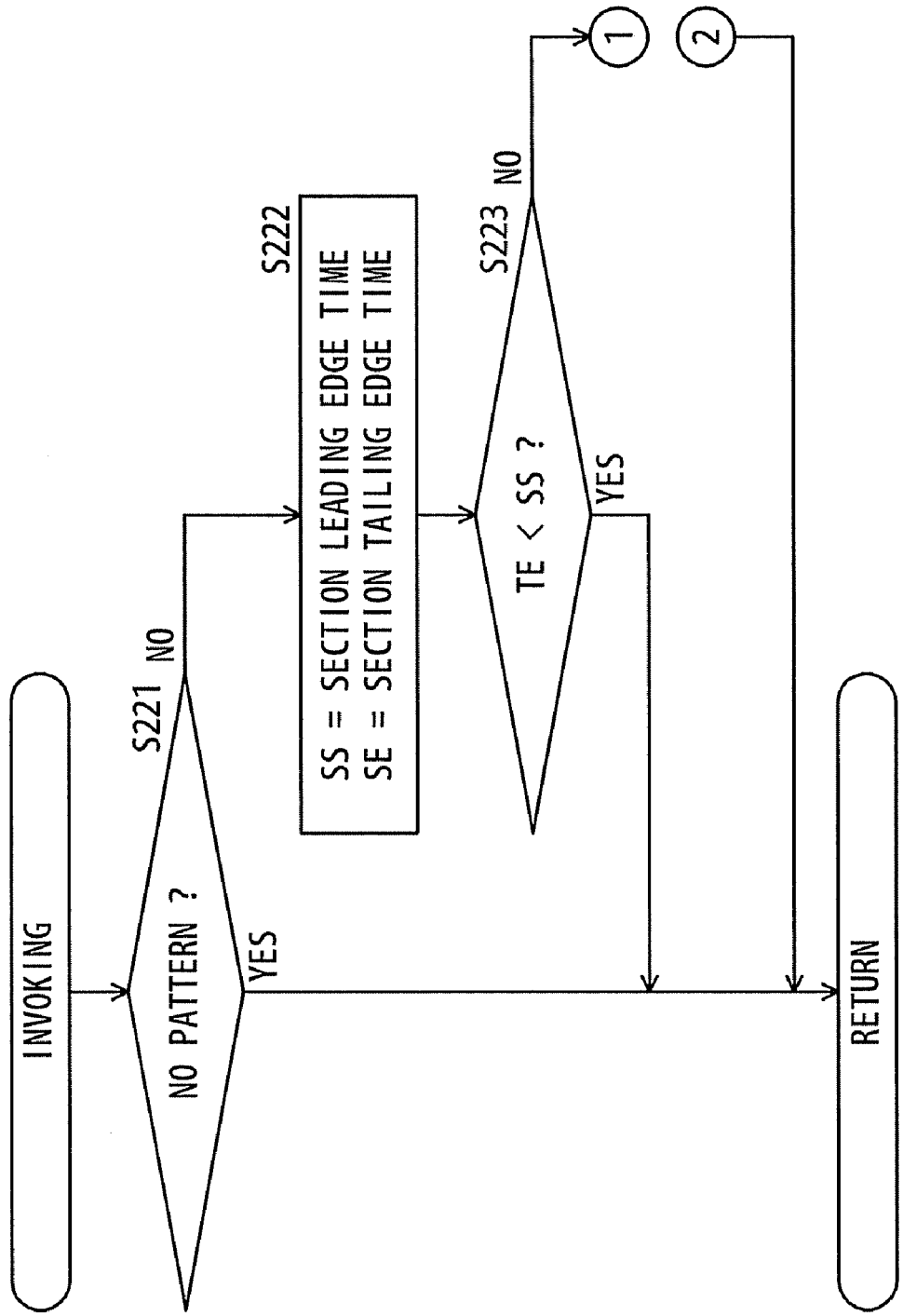
FIG. 10 is a flowchart illustrating a pattern determination subroutine.
Figure 11:
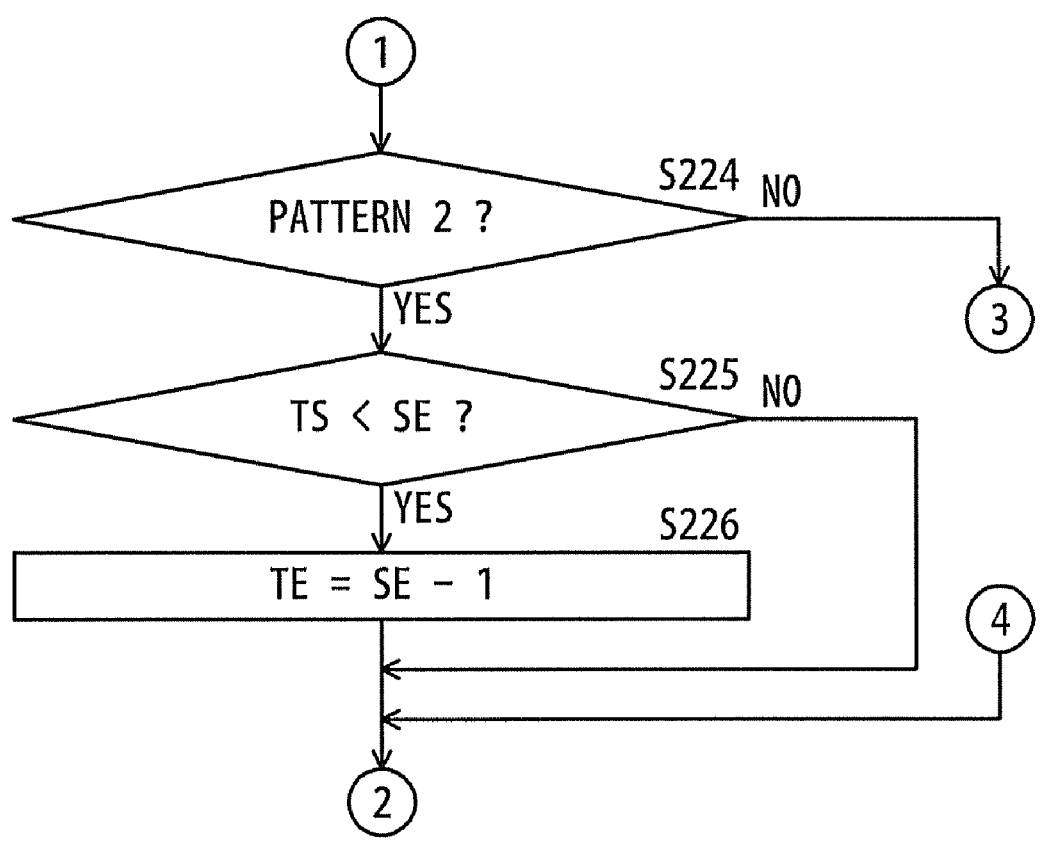
FIG. 11 is a flowchart illustrating a pattern determination subroutine.
Figure 12:
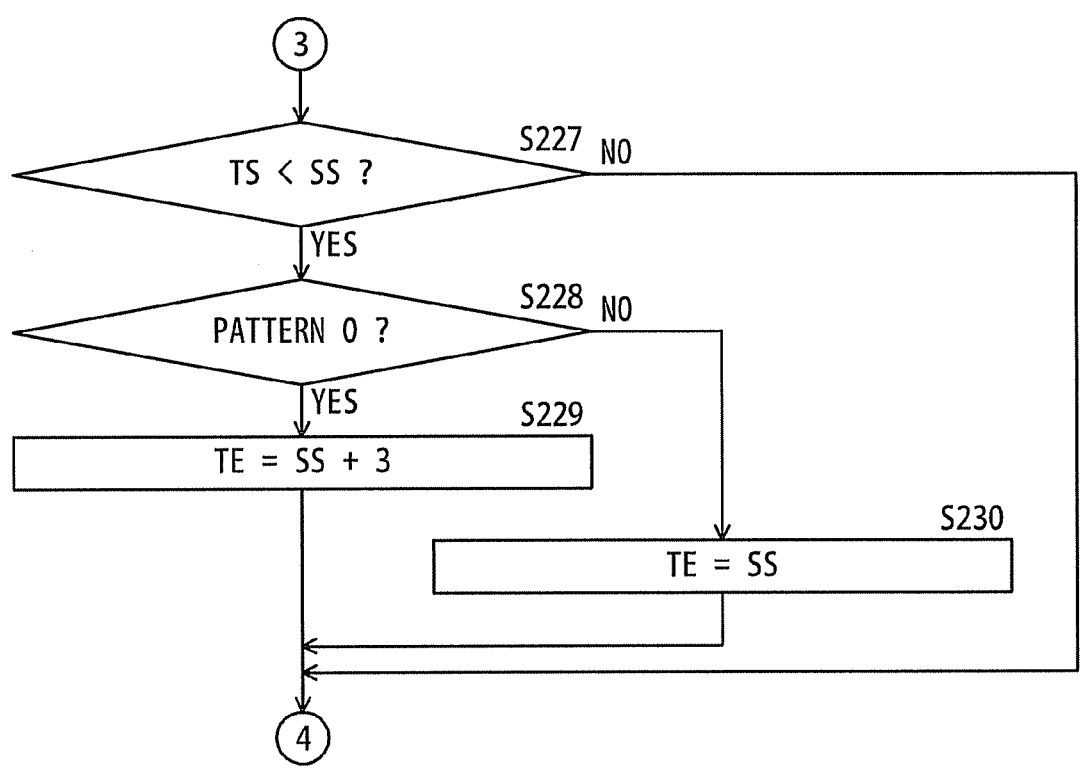
FIG. 12 is a flowchart illustrating a pattern determination subroutine.

FIGS. 10 through 12 are flowcharts each illustrating the pattern determination subroutine.

In first step S221 after starting the pattern determination subroutine, the CPU 40k decides whether or not a value (pattern number) exists (is registered) in the pattern field of the processing target record. Then, if any value (pattern number) does not exist in the pattern field of the processing target record, the CPU 40k terminates the pattern determination subroutine related to FIGS. 10 through 12, then returns to the skip process related to FIG. 9, and finishes this round of the processing target record in the first processing loop L1. While on the other hand, if the value (pattern number) exists in the pattern field of the processing target record, the CPU 40k diverts the process from step S221 to step S222.

In step S222, the CPU 40k substitutes a value (start time) in the start field of the processing target record into a variable SS, and substitutes a value (end time) in the end field of the processing target record into a variable SE.

In next step S223, the CPU 40k decides whether or not the value substituted into the variable TE is smaller than the value substituted into the variable SS. Then, if the value substituted into the variable TE is smaller than the value substituted into the variable SS, the CPU 40k terminates the pattern determination subroutine related to FIGS. 10 through 12, then returns to the skip process related FIG. 9, and finishes this round of the processing target record in the first processing loop L1. Whereas if the value substituted into the variable TE is equal to or larger than the value substituted into the variable SS, the CPU 40k diverts the process from step S223 to step S224 in FIG. 11.

In step S224, the CPU 40k decides whether the value (pattern number) in the pattern field of the processing target record is 2 or not. Then, if the value (pattern number) in the pattern field of the processing target record is 2, the CPU 40k advances the process to step S225 from S224.

In step S225, the CPU 40k decides whether the value substituted into the variable TS is smaller than the value substituted into the variable SE or not. Then, if the value substituted into the variable TS is equal to or larger than the value substituted into the variable SE, the CPU 40k diverts the process from step S225, then returns to the skip process related to FIG. 9 after terminating the pattern determination subroutine related to FIGS. 10 through 12, and finishes this round of the processing target record in the first processing loop L1. Whereas if the value substituted into the variable TS is smaller than the value substituted into the variable SE, the CPU 40k advances the process to step S226 from step S225.

In step S226, the CPU 40k changes the value substituted into the variable TE to a value obtained by subtracting 1 sec from the value substituted into the variable SE. Thereafter, the CPU 40k terminates the pattern determination subroutine related to FIGS. 10 through 12, then returns to the skip process related FIG. 9, and finishes this round of the processing target record in the first processing loop L1.

Whereas if the value (pattern number) in the pattern field of the processing target record is not 2 (i.e., if the pattern number is 0 or 1), the CPU 40k diverts the process from step S224 to step S227 in FIG. 12.

In step S227, the CPU 40k decides whether or not the value substituted into the variable TS is smaller than the value substituted into the variable SS. Then, if the value substituted into the variable TS is equal to or larger than the value substituted into the variable SS, the CPU 40k diverts the process from step S227, then returns to the skip process related to FIG. 9 after terminating the pattern determination subroutine related to FIGS. 10 through 12, and finishes this round of the processing target record in the first processing loop L1. Whereas if the value substituted into the variable TS is smaller than the value substituted into the variable SS, the CPU 40k advances the process to step S228 from step S227.

In step S228, the CPU 40k decides whether the value (pattern number) in the pattern field of the processing target record is 0 or not. Then, if the value (pattern number) in the pattern field of the processing target record is 0, the CPU 40k advances the process to step S229 from step S228.

In step S229, the CPU 40k changes the value substituted into the variable TE to a value obtained by adding 3 sec to the value substituted into the variable SS. Thereafter, the CPU 40k terminates the pattern determination subroutine related to FIGS. 10 through 12, then returns to the skip process related FIG. 9, and finishes this round of the processing target record in the first processing loop L1.

Whereas if the value (pattern number) in the pattern field of the processing target record is not 0 (i.e., if the pattern number is 1), the CPU 40k diverts the process from step S228 to step S230.

In step S230, the CPU 40k changes the value substituted into the variable TE to the value substituted into the variable SS. Thereafter, the CPU 40k terminates the pattern determination subroutine related to FIGS. 10 through 12, then returns to the skip process related FIG. 9, and finishes this round of the processing target record in the first processing loop L1.

The CPU 40k, after finishing the execution of step S205 (the pattern determination subroutine) with respect to all of the records in the section table 44 acquired in step S203, exits the first processing loop L1, and advances the process to step S206.

It should be noted that the CPU 40k executing steps S202 through S205 and the first processing loop L1 corresponds to the specifying unit described above.

In step S206, the CPU 40k instructs the reproducing control module 42g to move the reproducing point to a resuming point specified by the value substituted into the variable TE. Thereafter, the CPU 40k terminates the skip process related to FIG. 9.

It should be noted that the CPU 40k executing step S206 corresponds to the resuming unit described above.

[[Operational Effect]]

In the TV PC 40 according to the embodiment, when the recording control module 42e finishes recording the broadcasted TV program and saves the video data 43 in the storage unit 40j, the section (frames) containing the predetermined type of scene is extracted, and the section table 44 (see FIG. 7) about the video data 43 is generated (steps S101-S105). The section table 44 is stored with the information on the section containing the predetermined type (composition, highlight, CM, news) of scene and with the pattern number associated with the combination of the genre of the TV program related to this video content and the scene type.

Thereafter, when the operator gives the instruction of selecting the arbitrary video content from within the recorded video contents and reproducing the selected video content, the video content is reproduced based on the video data 43 related to this video content. The picture of the video content is, as depicted in FIG. 8, screened in the picture framing area 51 displayed together with the time line 52, and the indicator 52b indicating the reproducing point is displayed on the time line 52. Furthermore, the section (frames) extracted from within the on-reproducing video content is expressed as the blocks 52*m*, 52*c*. It is therefore feasible to grasp where the section containing the predetermined type of scene exists on the video time base, from the positions and the lengths of the leading edges and the tailing edges of the blocks 52*m*, 52*c* on the time line 52 and from internal information.

Moreover, when the operator gives a skip instruction during the reproduction of the video content, the reproduction of the video content is interrupted (step S201), then the moving destination of the reproducing point is specified (steps S202-S205, the first processing loop L1), and the reproduction of the video content resumes (step S206).

Herein, for example, if the point of time (TE) after 30 sec from the point of time (TS) at which the skip instruction is given exists nowhere in the section extracted from the video content (step S223;Yes), it follows that the reproducing point is moved to a 30-sec forward position in the same way as hitherto done (step S206).

Figure 13:
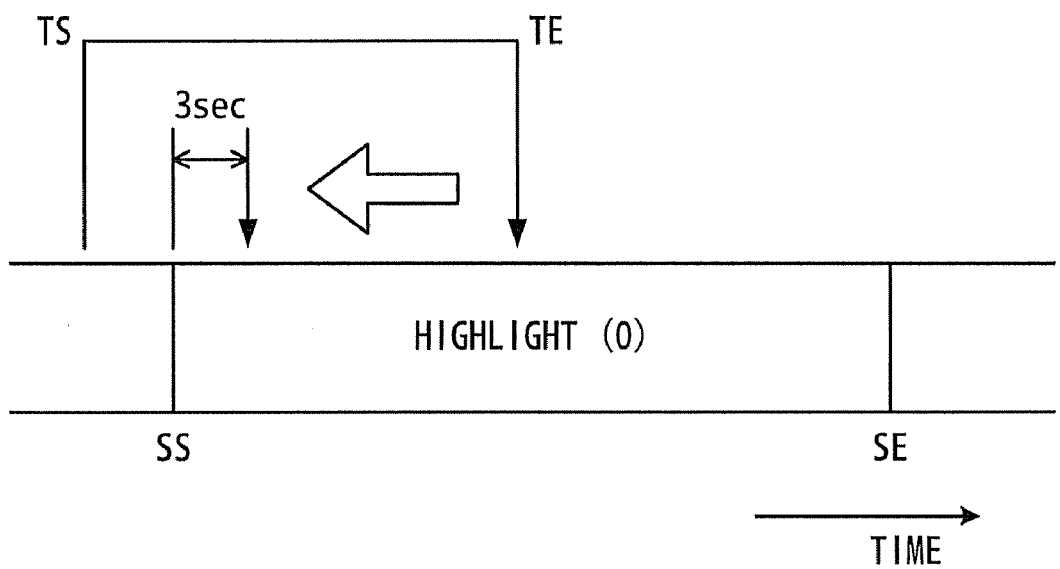
FIG. 13 is a diagram illustrating one example of moving of a reproducing point in a section that a scene type is a highlight.

Further, for example, in the case of reproducing the video content of the TV program of which the genre is categorized as sports, if the point of time (TE) after 30 sec from the point of time (TS) at which to give the skip instruction exists in the section with "highlight" defined as its scene type (which is the section having "0" as the pattern number) (step S223; No, S224; No, S227;Yes, S228;Yes), as illustrated in FIG. 13, the point of time after 3 sec from the leading edge of this section is specified as the moving destination of the reproducing point (step S229), and the reproducing point is moved to that point of time (step S206). In this case, a time width of the skipped portion (skipped frames) is often shorter than 30 sec, with the result that the operator neither overlooks the head of the want-to-view scene nor has a necessity for adjusting a return quantity back to the resuming point by performing a back-skip.

Figure 14:
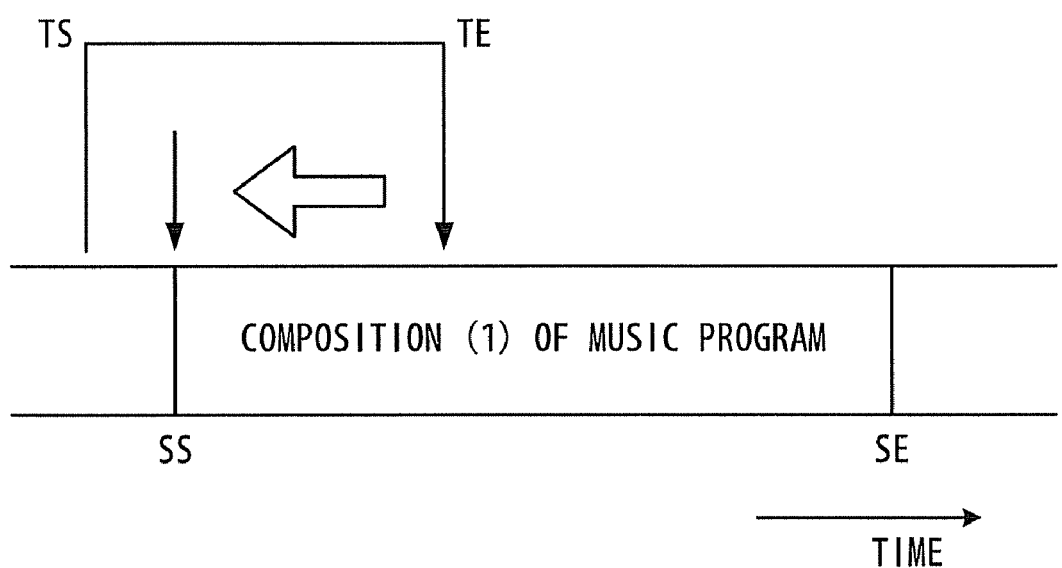
FIG. 14 is a diagram illustrating one example of moving of a reproducing point in a section that a scene type is music.

Moreover, for example, in the case of reproducing the video content of the TV program of which the genre is categorized as music, if the point of time (TE) after 30 sec from the point of time (TS) at which to give the skip instruction exists in the section with "music" defined as its scene type (which is the section having "1" as the pattern number) (step S223; No, S224; No, S227; Yes, S228; No), as illustrated in FIG. 14, the point of time coincident with the leading edge of this section is specified as the moving destination of the reproducing point (step S230), and the reproducing point is moved to that point of time (step S206). In this case, a time width of the skipped portion (skipped frames) is shorter than 30 sec, with the result that the operator neither overlooks the head of the want-to-view scene nor has the necessity for adjusting the return quantity back to the resuming point by performing the back-skip.

Figure 15:
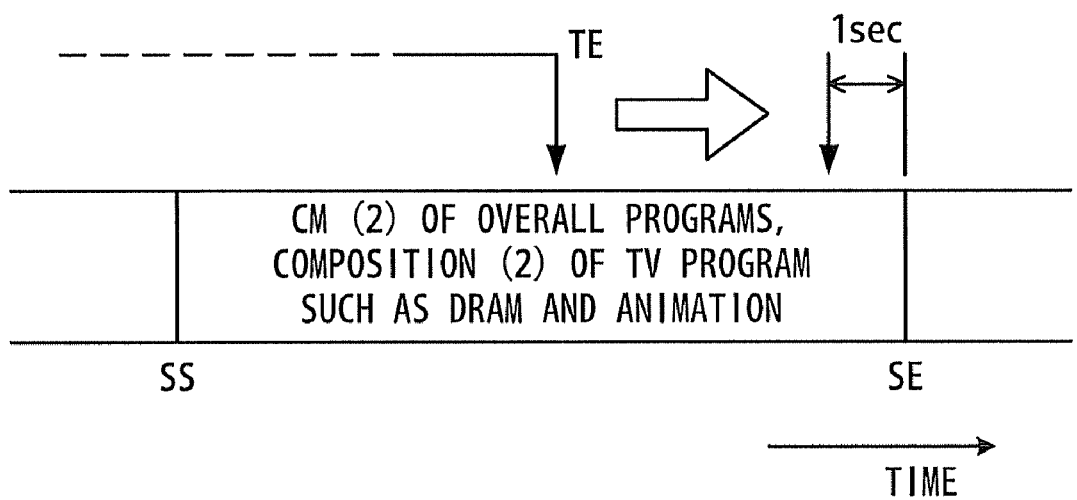
FIG. 15 is a diagram illustrating one example of moving of a reproducing point in a section that a scene type is a CM.

Furthermore, for example, in the case of reproducing overall genres of TV programs, if the point of time (TE) after 30 sec from the point of time (TS) at which to give the skip instruction exists in the section with "CM" or "news" as its scene type (which is the section having "2" as the pattern number) (step S223; No, S224;Yes, S225;Yes), as illustrated in FIG. 15, the point of time before 1 sec from the tailing edge of this section is specified as the moving destination of the reproducing point (step S226), and the reproducing point is moved to that point of time (step S206). In this case, a time width of the skipped portion (skipped frames) is often longer than 30 sec, with the result that the operator neither clicks twice or more the 30-sec skip button 53 nor has the necessity for adjusting the return quantity back to the resuming point by performing the back-skip.

Moreover, for example, in the case of reproducing overall genres of TV programs, also when the tailing edge of the section (which is the section having "2" as the pattern number) of which the scene type is "CM" or "news" exists between the point of time (TS) at which to give the skip instruction and the point of time (TE) after 30 sec (step S223; No, S224;Yes, S225;Yes), the point of time before 1 sec from the tailing edge of this section is specified as the moving destination of the reproducing point (step S226), and the reproducing point is moved to that point of time (step S206). In this case, the time width of the skipped portion (skipped frames) is shorter than 30 sec, with the result that the operator neither misses a chance to view the want-to-view scene nor has the necessity for adjusting the return quantity back to the resuming point by performing the back-skip.

Further, with respect to the section containing the scene of "composition (piece of music)" in the TV program of which the genre is categorized into "drama" or "animation", in the same way as in the section containing the scene of "CM" or "news", if the point of time (TE) after 30 sec from the point of time (TS) at which to give the skip instruction exists in the section of "composition" or if the tailing edge of the section of "composition" exists between the point of time (TS) at which to give the skip instruction and the point of time (TE) after 30 sec, the reproducing point is moved to a position equivalent to 1 sec anterior from the tailing edge of the section of "composition".

[[Explanations Concerning Units]]

In the embodiment discussed above, the respective units 40*e*-40*l* in the TV PC 40 may each be constructed of a software component and a hardware component and may also be constructed of only the hardware component.

The software component can be exemplified by an interface program, a driver program, a table and data and by a combination of some of these components. These components may be stored on a readable-by-computer medium that will be explained later on and may also be firmware that is fixedly incorporated into a storage device such as a ROM (Read only Memory) and an LSI (Large Scale Integration).

Moreover, the hardware component can be exemplified by an FPGA (Field Programmable Gate Array), an ASIC (Application Specific Integrated Circuit), a gate array, a combination of logic gates, a signal processing circuit, an analog circuit and other types of circuits. Among these components, the logic gate may include an AND, an OR, a NOT, a NAND, a flip-flop, a counter circuit and so on. Moreover, the signal processing circuit may include circuit elements which execute addition, multiplication, subtraction, inversion, a sum-of-products operation, differentiation and integration of signal values. Further, the analog circuit may include circuit elements which execute amplification, addition, multiplication, differentiation, integration, etc.

Note that the components building up the respective units 40*e*-40*l* in the TV PC 40 described above are not limited to those exemplified above but may be other components equivalent thereto.

[[Explanation about Software and Program]]

In the embodiment discussed above, the OS software 41, the TV software 42, the respective modules 42*a*-42*c*, 42*e*, 42*g*, 42*h* configuring the TV software 42, the respective tables 42*d*, 42*f*, the video data 43, the section table 44 and the software components described above within the TV PC 40, may each include a software component, a procedure-oriented language based component, an object-oriented software component, a class software component, a component managed as a task, a component managed as a process, and elements such as a function, an attribute, a procedure (Procedure), a subroutine (software routine), a fragment or segment of a program code, a driver, firmware, a microcode, a code, a code segment, an extra segment, a stack segment, a program area, a data area, data, a database, a data structure, a field, a record, a table, a matrix table, an array, a variable and a parameter.

Further, the OS software 41, the TV software 42, the respective modules 42a-42c, 42e, 42g, 42h configuring the TV software 42, the respective tables 42d, 42f, the video data 43, the section table 44 and the software components described above within the TV PC 40, may each be described in a C-language, C++, Java (trademark of Sun Microsystems in U.S.A.), Visualbasic (trademark of Microsoft Corp. in U.S.A.), Perl, Ruby and other programming languages.

Moreover, the instructions, the codes and the data, which are contained in the OS software 41, the TV software 42, the respective modules 42a-42c, 42e, 42g, 42h configuring the TV software 42, the respective tables 42d, 42f, the video data 43, the section table 44 and the software components described above within the TV PC 40, may be transmitted to or loaded into a computer and a computer incorporated into a machine or a system via a wired network card and a wired network or via a wireless card and a wireless network.

In the transmission or loading described above, the data signals flow via the wired network or the wireless network in the way of their being carried on, e.g., carrier waves. The data signals may also be, however, transferred intact as so-called baseband signals without depending on the carrier waves described above. These carrier waves are transmitted in an electric, magnetic or electromagnetic mode, an optical mode, an acoustic mode or other modes.

Herein, the wired network or the wireless network is a network built up by, e.g., a telephone line, a network line, a cable (including an optical cable and a metallic cable), a wireless link, a mobile phone access line, a PHS (Personal Handyphone System) network, a wireless IAN (Local Area Network) Bluetooth (trademark of the Bluetooth Special Interest Group), on-vehicle wireless type communications (DSRC: Dedicated Short Range Communication) and a network constructed of any one of those given above. Then, the data signals are used for transmitting the information including the instruction, the code and the data to a node or the component on the network.

Note that the OS software 41, the TV software 42, the respective modules 42a-42c, 42e, 42g, 42h configuring the TV software 42, the respective tables 42d, 42f, the video data 43, the section table 44 and the components configuring the software components described above within the TV PC 40, are not limited to those exemplified above and may also be other components equivalent thereto.

[[Explanation about Readable-by-Computer Medium]]

Any one of the functions in the embodiment discussed above may be coded and thus stored in a storage area on the readable-by-computer medium. In this case, the program for realizing the function can be provided to the computer or the computer incorporated into the machine or the system via the readable-by-computer medium. The computer or the computer incorporated into the machine or the system reads the program from the storage area on the readable-by-computer medium and executes the program, thereby enabling the function thereof to be realized.

Herein, the readable-by-computer medium connotes a recording medium capable of accumulating information such as the program and the data by electrical, magnetic, optical, chemical, physical or mechanical action, and retaining the information in a readable-by-computer status.

The electrical or magnetic action can be exemplified by writing the data to the element on the ROM (Read Only Memory) constructed by use of a fuse. The magnetic or physical action can be exemplified by a phenomenon of toners to form a latent image on a paper medium. Note that the information recorded on the paper medium can be read, e.g., optically. The optical and chemical action can be exemplified by forming a thin film or a rugged portion on a substrate. Incidentally, the information recorded in the ruggedness-utilized mode can be read, e.g., optically. The chemical action can be exemplified by oxidation-reduction reaction on the substrate or forming an oxide film or a nitride film on a semiconductor substrate, or a photo-resist phenomenon. The physical or mechanical action can be exemplified by forming a rugged portion on an emboss card or forming a punch-hole in the paper medium.

Moreover, in the readable-by-computer mediums, some mediums can be detachably attached to the computer or the computer incorporated into the machine or the system. The attachable/detachable readable-by-computer medium can be exemplified by a DVD (including DVD-R, DVD-RW, DVD-ROM, DVD-RAM), a +R/+WR, a BD (including BD-R, BD-RE, BD-ROM), a CD (Compact Disk) (including CD-R, CD-RW, CD-ROM), an MO (Magneto Optical) disk, other optical disk mediums, a flexible disk (including a floppy disk (Floppy is a trademark of Hitachi Ltd.)), other magnetic disk mediums, a memory card (CompactFlash (trademark of SanDisk Corp. in U.S.A.), SmartMedia (trademark of Toshiba Co., Ltd.), SD card (trademark of SanDisk Corp. in U.S.A., Matsushita Electric Industrial Co., Ltd. and Toshiba Co., Ltd.), Memory Stick (trademark of Sony Corp.), MMC (trademark of Siemens in U.S.A. and SanDisk Corp. in U.S.A.) etc), a magnetic tape and other tape mediums, and a storage device including, as a built-in component, anyone of those mediums. Some of the storage devices have a built-in DRAM (Dynamic Random Access Memory) or SRAM (Static Random Access Memory).

Furthermore, some of the readable-by-computer mediums are fixedly installed in the computer or the computer incorporated into the machine or the system. This type of readable-by-computer medium can be exemplified by a hard disk, a DRAM, an SRAM, a ROM, an EEPROM (Electronically Erasable and Programmable Read Only Memory) and a flash memory.

EFFECTS OF THE INVENTION

As explained above, according to the video reproducing device disclosed earlier, it is feasible to grasp where the predetermined scene exists on the video time base even during the reproduction of the video content.

What is claimed is:

1. A video reproducing device comprising:
an extracting unit that extracts, when acquiring video data for reproducing a video content including sounds and pictures, a section containing a predetermined type of scene from within the video content related to the acquired video data;
a reproducing unit that reproduces, when accepting an instruction of reproducing the video data from an operator, the video content based on the video data;
a display unit that displays a picture of the video content reproduced by the reproducing unit in a picture framing area, and displays a time line containing blocks specifying from a leading edge to a trailing edge of the section extracted by the extracting unit together with information specifying the type of scene and an indicator indicating a reproducing point of the video content;
an interrupting unit that interrupts, when receiving an instruction of a skip from the operator in the midst of reproducing the video content in the reproducing unit, the reproduction of the video content;

a specifying unit that selectively specifies, when the section extracted by the extracting unit includes a point of time posterior by a predetermined period of time to the reproducing point of the video content of which the reproduction is interrupted by the interrupting unit, a point of time in a vicinal area of the leading edge of the section as a resuming point of the reproduction or a point of time in a vicinal area of the trailing edge of the section as the resuming point, based on a skip destination predefined with respect to a combination of a program genre and the type of scene of the section extracted by the extracting unit; and a resuming unit that resumes the reproduction of the video content from the resuming point specified by the specifying unit.

2. A non-transitory computer readable recording medium storing a video reproducing program to be executed by a computer, the program executing:

extracting, when acquiring video data for reproducing a video content including sounds and pictures, a section containing a predetermined type of scene from within the video content related to the acquired video data;

reproducing, when accepting an instruction of reproducing the video data from an operator, the video content based on the video data;

displaying a picture of the video content reproduced by the reproducing in a picture framing area, and displaying a time line containing blocks specifying from a leading edge to a trailing edge of the section extracted by the extracting together with information specifying the type of scene and an indicator indicating a reproducing point of the video content;

interrupting, when receiving an instruction of a skip from the operator in the midst of reproducing the video content in the reproducing, the reproduction of the video content;

selectively specifying, when the section extracted by the extracting includes a point of time posterior by a predetermined period of time to the reproducing point of the video content of which the reproduction is interrupted by the interrupting, a point of time in a vicinal area of the leading edge of the section as a resuming point of the reproduction or a point of time in a vicinal area of the trailing edge of the section as the resuming point, based on a skip destination predefined with respect to a combination of a program genre and the type of scene of the section extracted by the extracting; and resuming the reproduction of the video content from the resuming point specified by the specifying.

3. A video reproducing method executed by a computer, comprising:

extracting, when acquiring video data for reproducing a video content including sounds and pictures, a section containing a predetermined type of scene from within the video content related to the acquired video data;

reproducing, when accepting an instruction of reproducing the video data from an operator, the video content based on the video data;

displaying a picture of the video content reproduced by the reproducing in a picture framing area, and displaying a time line containing blocks specifying from a leading edge to a trailing edge of the section extracted by the extracting together with information specifying the type of scene and an indicator indicating a reproducing point of the video content;

interrupting, when receiving an instruction of a skip from the operator in the midst of reproducing the video content in the reproducing, the reproduction of the video content;

selectively specifying, when the section extracted by the extracting includes a point of time posterior by a predetermined period of time to the reproducing point of the video content of which the reproduction is interrupted by the interrupting, a point of time in a vicinal area of the leading edge of the section as a resuming point of the reproduction or a point of time in a vicinal area of the trailing edge of the section as the resuming point, based on a skip destination predefined with respect to a combination of a program genre and the type of scene of the section extracted by the extracting; and resuming the reproduction of the video content from the resuming point specified by the specifying.

* * * * *